Patented Dec. 17, 1940

2,225,357

UNITED STATES PATENT OFFICE 2,225,357

NITROSATION OF PHENOLS

John W. Teter, Chicago, Ill., assignor to Sinclair Refining Company, New York, N. Y., a corporation of Maine No Drawing. Application June 12, 1937, Serial No. 147,869

14 Claims. (Cl. 260—621)

This invention relates to the production of nitroso phenolic compounds. More particularly, the invention relates to the production of nitroso phenolic compounds wherein a phenolic compound is nitrosated by subjecting it to the action of nitrous acid and comprises improvements in such a process whereby a substantially pure product may be readily obtained.

Nitroso phenolic compounds have been prepared heretofore by subjecting a phenolic compound to the action of nitrous acid. In general, this nitrosation has been effected by subjecting an alkaline solution of the phenolic compound such as phenol, for example, together with sodium nitrite to the action of a mineral acid, such, for example, as sulphuric acid. In such a process the phenol is dissolved in a solution of an alkali such, for example, as sodium hydroxide with the resulting formation of sodium phenolate. To this solution of sodium phenolate is added an appropriate amount of sodium nitrite. Upon the addition of sulphuric acid to the solution, the sulphuric acid reacts with the sodium nitrite to liberate nitrous acid. The nitrous acid thus liberated reacts with the sodium phenolate to produce the sodium salt of the nitroso phenol which simultaneously reacts with the sulphuric acid to yield the nitroso-phenol.

It is well known that nitrosation of phenolic compounds is a reaction which is affected to an unusual extent by slight variations in any one of the several factors that govern a successful preparation of the nitroso derivative. For example, the molal quantity of alkali nitrite should not exceed the molal quantity of phenolic compound being nitrosated. Only that amount of alkali nitrite should be used which will yield an amount of nitrous acid equivalent to the amount of phenolic compound being treated. If an excess of alkali nitrite is present to react with free acid, an excess of nitrous acid is produced over and above that amount of nitrous acid which will completely nitrosate the phenolic compound. Nitrous acid readily decomposes if present in a substantial excess to form nitric acid and nitric oxide, and the nitric acid reacts with the sodium nitrite to form more nitrous acid. Hence, there is a serious depletion of the nitrite which results in a low yield and a highly impure product. Secondly, an excess of nitrous acid forms a diazonium salt with the uncrystallized nitroso phenolic compound, and a further excess of nitrous acid acts as reducing agent on the diazonium salt to produce by-products which appear as impuritites in the nitroso derivative of the phenolic compound.

It is also known that a low temperature must be maintained throughout the entire reaction. Nitrous acid is extremely unstable at temperatures above approximately 32° F. As noted above, the nitric acid formed as a result of decomposition of nitrous acid seriously impairs the yield of the nitroso phenolic compound.

Thorough mechanical agitation is also necessary during the entire reaction period. Inasmuch as the reaction between the phenolic compound and nitrous acid is exothermic, vigorous stirring is necessary to prevent local overheating within the reaction solution which tends to decompose free nitrous acid. Inasmuch as nitrous acid, as well as being unstable at temperatures in excess of about 32° F., is also unstable in high concentrations, even at lower temperatures, vigorous agitation is necessary to insure against any local high concentration of nitrous acid.

Due to the fact that the reaction between the phenolic compound and nitrous acid is not ionic but is organic, the rate of the nitrosation reaction must be very slow to prevent the existence at any time of a high concentration of nitrous acid or an excess of mineral acid. As pointed out above, a high concentration of nitrous acid tends to cause decomposition thereof. Furthermore, the nitroso derivatives tautomerize in an acid medium and the tautomeric form is most readily oxidized. For this reason, therefore, it is desirable to insure against the presence of excess acid in the reaction solution. By carefully controlling the rate at which the mineral acid is added to the reaction solution together with thorough agitation, the rate of formation of nitrous acid may be directly controlled and the alkaline character of the reaction solution may be maintained.

It is also known that further care must be taken in controlling the concentration of the phenolic compound being nitrosated. If the compound is present in excess of the optimum concentration the resulting nitroso phenol is of poor quality and the yield is adversely affected.

When all of these well known factors have been carefully controlled, the resulting nitroso phenol or phenolic compound nevertheless is often of dark color and unsatisfactory purity. I have found, however, that by carefully controlling these and other factors heretofore unknown a nitroso phenolic compound of excellent color and high degree of purity may be readily and consistently obtained.

I have found, for example, that in spite of all precautions taken there is a tendency for the nitrous acid to decompose in the reaction solution. This is particularly true toward the end of the reaction period. The nitric oxide produced by this decomposition rapidly combines with free oxygen in the atmosphere above the solution to form nitrogen peroxide. The nitrogen peroxide rapidly oxidizes the nitroso phenolic compounds, whether crystallized or uncrystallized, to form impurities.

I have found, furthermore, that the period of crystallization of the nitroso derivative from the reaction solution accompanied by thorough agitation is also a factor to be taken into consideration. If the mechanical agitation of the reaction solution is stopped within a short time after all of the mineral acid has been added to the reaction solution, the nitroso derivative which crystallizes out of the solution has a poor color and is undesirably impure.

I have also found that the pH value of the final solution from which the nitroso derivative of the phenolic compound is crystallized has a marked effect upon the purity of the crystallized nitroso derivative.

My invention comprises, therefore, the discovery that if the factors heretofore known to influence the nitrosation reaction are carefully controlled and that if in addition the nitrogenous fumes are swept out of the reaction chamber, if agitation of the solution is maintained during crystallization of the nitroso phenolic compound from the reaction solution, and if the pH value of the final reaction solution is controlled, phenolic compounds may be nitrosated so as to obtain consistently high yields of pure nitroso derivatives.

The removal of the nitrogenous fumes from the reaction chamber may be accomplished by sweeping the atmosphere above the reaction solution with a gas which is inert with respect to the reaction solution. The reaction chamber may be swept with advantage with nitrogen, air, carbon dioxide, or other similarly inert gas. The rate at which the inert gas is passed through the upper portion of the reaction chamber need be only such as to insure prompt removal of nitrogenous fumes from the atmosphere above the reaction solution.

Agitation of the reaction solution should be maintained for a substantial period after addition of the mineral acid to the phenolic solution has been completed. The nitroso phenolic compound does not crystallize immediately from the reaction solution but requires a considerable length of time for this crystallization. The agitation of the reaction solution is continued with advantage throughout substantially the entire crystallization period. In the now preferred embodiment of my invention the period of crystallization accompanied by thorough agitation of the reaction solution should be at least one half the length of time required for the controlled addition of mineral acid to the phenolic solution.

The acid or basic character of the reaction solution from which the nitroso derivative is crystallized should be carefully controlled. The pH of the final reaction solution should be adjusted to substantially that of a solution of the pure nitroso phenolic compound; a pH value substantially above or below that of the pure nitroso derivative tends to discolor the nitroso derivative with impurities as it crystallizes from the reaction solution. I have found that the pH value of carbonic acid closely approximates that of a solution of most pure nitroso phenolic compounds. By neutralizing excess acid in the final reaction solution by adding thereto a small quantity of an alkali such, for example, as sodium hydroxide and by subsequently passing gaseous carbon dioxide through the reaction solution, the pH of the solution from which the nitroso derivative is crystallized is adjusted to the optimum value.

The process of my invention will be more clearly understood by the following illustration of my process in which, for simplicity, the quantities of reagents used are expressed in molar concentration:

*Example*

1.0 mol of sodium hydroxide is dissolved in 1800 c. c. of water and to this solution 1.0 mol of o-cresol is added. After the o-cresol has been completely dissolved, preferably with thorough agitation, 1.0 mol of sodium nitrite is dissolved in the solution. The solution is then cooled to 28° F. and this temperature is preferably maintained throughout the entire reaction and crystallization periods. 1.0 mol (2.0 equivalents) of sulphuric acid is then diluted with water to a total volume of approximately 200 c. c. Of the two equivalents of sulphuric acid, one equivalent is required to react with the sodium nitrite to produce nitrous acid and one equivalent is required to neutralize the sodium hydroxide in which the o-cresol was initially dissolved. This solution of sulphuric acid is then cooled at least to room temperature and preferably to about 28° F. The dilute acid is then added to the cold reaction solution at such a rate that it requires approximately 1.0 hour to add the 200 c. c. of acid. Thorough agitation must be maintained throughout the entire reaction period, and care should be taken that the temperature of the reaction solution does not rise substantially above 28° F. After 180 c. c. of the dilute sulphuric acid have been added to the reaction solution, nitrogen or air is passed through the upper portion of the reaction chamber in order to sweep from the atmosphere above the reaction solution any nitrogen dioxide fumes which may be evolved. The nitrogen or air is passed through the reaction chamber with advantage until all of the dilute sulphuric acid has been added to the reaction solution. After all of the acid has been added, 0.01 mol of sodium hydroxide dissolved in about 10 c. c. of water is added to the reaction solution, and then carbon dioxide is passed slowly through the reaction solution. The reaction solution is thoroughly agitated for an additional 0.5 hour during at least the greater portion of which time the carbon dioxide is passed through the solution. The light brown crystals of p-nitroso-o-cresol which have precipitated from the reaction solution are rapidly filtered and thoroughly washed with cold water, preferably without allowing the product to dry on the filter. The nitroso cresol may then be removed from the filter and dried at room temperature. The melting point of the crude product is 110° C. with a yield of 88.5% of the theoretical yield. Upon dissolving the crude product in alcohol and crystallization therefrom, the nitroso cresol has a melting point of 128° C.

When p-nitroso-o-cresol is prepared by using exactly the same proportion of reagents as in the example but without sweeping the vapor space with nitrogen or air during the latter part of the reaction period and without acidifying the final reaction solution with carbon dioxide, a dark brown product is obtained having a melting point of 82° C. with a yield of 70% of the theoretical yield. Upon crystallization from alcohol, this product melted at 118° C. Moreover, if p-nitroso-o-cresol is prepared exactly as in the example but with a period of agitation during crystallization, after all of the sulphuric acid has been added, shortened to less than half the reaction period (i. e. less than 0.5 hour in the example) the final product has a tendency to decompose on filtering and is impure as indicated by its dark color and low melting point. Furthermore, if the pH value of the reaction solution from which the nitroso cresol is crystallized in the example is not adjusted to approximately that of a solution of the nitroso cresol but is more acidic, for example, the final nitroso cresol contains impurities patently indicated by the low melting point and dark color of the product.

It is readily apparent, therefore, that if all of the factors known to influence the nitrosation of phenolic compounds are carefully controlled, the resulting product is impure in the absence of careful control of the factors which I have found to affect the purity of the resulting nitroso derivative. By carefully controlling all of the factors heretofore known and by sweeping the atmosphere above the reaction solution with an inert gas followed by the adjustment of the pH of the final reaction solution substantially to that of carbon dioxide together with thorough agitation during a crystallization period which is at least one half the length of the reaction period, a pure nitroso phenolic compound may be consistently and efficiently prepared.

While I have illustrated the process of my invention by the nitrosation of o-cresol, my invention is applicable to the nitrosation of other phenolic compounds such, for example, as phenol, cresols, xylenols, and the like.

I claim:

1. In the production of nitroso phenolic compounds wherein a phenolic compound is subjected to the action of nitrous acid in a suitable reaction chamber, the improvement which comprises removing nitrogenous vapors from the reaction chamber by introducing an inert gas into the reaction chamber.

2. In the production of nitroso phenolic compounds wherein a phenolic compound is subjected to the action of nitrous acid in a suitable reaction chamber, the improvement which comprises adjusting the pH value of the final reaction solution to the pH value of the nitroso phenolic compound by passing carbon dioxide through the solution.

3. In the production of nitroso phenolic compounds wherein a solution of a phenolic compound is subjected to the action of nitrous acid to produce a nitroso phenolic compound, the improvement which comprises adjusting the pH value of the final reaction solution to the pH value of the nitroso phenolic compound by adding carbon dioxide to the final reaction solution.

4. In the production of nitroso phenolic compounds wherein a solution of a phenolic compound is subjected to the action of nitrous acid over a period of time with the subsequent crystallization of a nitroso phenolic compound from the solution, the improvement which comprises allowing the nitroso phenolic compound to crystallize from the solution accompanied by agitation for a period equal to substantially one half of the nitrosating period.

5. In the production of nitroso phenolic compounds wherein a phenolic compound is nitrosated in a suitable reaction chamber by subjecting a solution of the compound to the action of nitrous acid with the subsequent crystallization of the nitroso phenolic compound from the reaction solution, the improvement which comprises removing nitrogen dioxide vapors from the reaction chamber by passing an inert gas through the reaction chamber, adjusting the pH value of the final reaction solution from which the nitroso phenolic compound is crystallized substantially to the pH value of the nitroso compound by adding carbon dioxide to the final reaction solution, and allowing the nitroso compound to crystallize with agitation from the final reaction solution for a period of time equal to substantially one half of the nitrosating period.

6. In the production of nitroso phenolic compounds by the nitrosation of a phenolic compound in a suitable reaction chamber wherein a solution of the phenolic compound is subjected over a period of time to the action of nitrous acid, the improvement which comprises removing from the reaction chamber nitrogen dioxide fumes produced by decomposition of the nitrous acid by passing an inert gas through the reaction chamber.

7. In the production of nitroso phenolic compounds by nitrosating a phenolic compound in a suitable reaction chamber wherein a solution of the phenolic compound is subjected with mechanical agitation to the action of an equivalent amount of nitrous acid at a temperature of approximately —2° C. with subsequent crystallization of the nitroso phenolic compound from the reaction solution, the improvement which comprises removing from the reaction chamber nitrogen dioxide fumes produced by decomposition of the nitrous acid by passing an inert gas through the reaction chamber, adjusting the pH value of the final reaction solution from which the nitroso phenolic compound is crystallized substantially to the pH value of the nitroso phenolic compound by adding carbon dioxide to the final reaction solution, and allowing the nitroso phenolic compound to crystallize with agitation from the final reaction solution for a period of time equal to substantially one half of the nitrosating period.

8. In the production of nitroso phenolic compounds wherein a phenol of the group consisting of phenol, cresols and xylenols is subjected to the action of nitrous acid in a suitable reaction chamber, the improvement which comprises removing nitrogenous vapors from the reaction chamber by introducing an inert gas into the reaction chamber.

9. In the production of nitroso phenolic compounds wherein a phenol of the group consisting of phenol, cresols and xylenols is subjected to the action of nitrous acid in a suitable reaction chamber, the improvement which comprises adjusting the pH value of the final reaction solution to the pH value of the nitroso phenol by passing carbon dioxide through the solution.

10. In the production of nitroso phenolic compounds wherein a solution of a phenol of the group consisting of phenol, cresols and xylenols is subjected to the action of nitrous acid to produce a nitroso phenol, the improvement which comprises adjusting the pH value of the final reaction solution to the pH value of the nitroso phenol by adding carbon dioxide to the final reaction solution.

11. In the production of nitroso phenolic compounds wherein a solution of a phenol of the group consisting of phenol, cresols and xylenols is subjected to the action of nitrous acid over a period of time with the subsequent crystallization of a nitroso phenol from the solution, the improvement which comprises allowing the nitroso phenol to crystallize from the solution accompanied by agitation for a period equal to substantially one half of the nitrosating period.

12. In the production of nitroso phenolic compounds wherein a phenol of the group consisting of phenol, cresols and xylenols is nitrosated in a suitable reaction chamber by subjecting a solution of the phenol to the action of nitrous acid with the subsequent crystallization of the nitroso phenol from the reaction solution, the improvement which comprises removing nitrogen dioxide vapors from the reaction chamber by passing an inert gas through the reaction chamber, adjusting the pH value of the final reaction solution from which the nitroso phenol is crystallized substantially to the pH value of the nitroso phenol by adding carbon dioxide to the final reaction solution, and allowing the nitroso phenol to crystallize with agitation from the final reaction solution for a period of time equal to substantially one half of the nitrosating period.

13. In the production of nitroso phenolic compounds by the nitrosation of a phenol of the group consisting of phenol, cresols and xylenols in a suitable reaction chamber wherein a solution of the phenol is subjected over a period of time to the action of nitrous acid, the improvement which comprises removing from the reaction chamber nitrogen dioxide fumes produced by decomposition of the nitrous acid by passing an inert gas through the reaction chamber.

14. In the production of nitroso phenolic compounds by nitrosating a phenol of the group consisting of phenol, cresols and xylenols in a suitable reaction chamber wherein a solution of the phenol is subjected with mechanical agitation to the action of an equivalent amount of nitrous acid at a temperature of approximately $-2°$ C. with subsequent crystallization of the nitroso phenol from the reaction solution, the improvement which comprises removing from the reaction chamber nitrogen dioxide fumes produced by decomposition of the nitrous acid by passing an inert gas through the reaction chamber, adjusting the pH value of the final reaction solution from which the nitroso phenol is crystallized substantially to the pH value of the nitroso phenol by adding carbon dioxide to the final reaction solution, and allowing the nitroso phenol to crystallize with agitation from the final reaction solution for a period of time equal to substantially one half of the nitrosating period.

JOHN W. TETER.